(12) United States Patent
Leicht

(10) Patent No.: US 7,748,600 B2
(45) Date of Patent: Jul. 6, 2010

(54) PROCESS AND DEVICE FOR SOLDERING IN THE VAPOR PHASE

(75) Inventor: Helmut W. Leicht, Königsbrunn b. Agb (DE)

(73) Assignee: IBl Löttechnik GmbH, Königsbrunn (DE)

( * ) Notice: Subject to any disclaimer, the term of this patent is extended or adjusted under 35 U.S.C. 154(b) by 235 days.

(21) Appl. No.: 10/592,483

(22) PCT Filed: Mar. 11, 2004

(86) PCT No.: PCT/EP2004/002538

§ 371 (c)(1),
(2), (4) Date: Sep. 11, 2006

(87) PCT Pub. No.: WO2005/087422

PCT Pub. Date: Sep. 22, 2005

(65) Prior Publication Data

US 2007/0194083 A1 Aug. 23, 2007

(51) Int. Cl.
*B23K 37/047* (2006.01)
*B23K 1/012* (2006.01)

(52) U.S. Cl. ............... 228/234.2; 228/42; 228/218; 228/219; 228/221; 34/34; 34/78; 432/34; 432/197

(58) Field of Classification Search ......... 228/218–221, 228/234.2, 42; 34/34, 78; 432/34, 197
See application file for complete search history.

(56) References Cited

U.S. PATENT DOCUMENTS

| 3,460,816 | A | | 8/1969 | Miller ........................... 266/5 |
| 4,077,467 | A | | 3/1978 | Spigarelli ..................... 165/105 |
| 4,392,049 | A | | 7/1983 | Bentley et al. ............... 219/401 |
| 4,466,791 | A | * | 8/1984 | Jacobs et al. .................. 432/23 |
| 4,558,524 | A | * | 12/1985 | Peck et al. ..................... 34/78 |
| 4,838,476 | A | * | 6/1989 | Rahn ........................ 228/180.1 |
| 4,860,942 | A | | 8/1989 | Takvorian .................... 228/220 |
| 5,038,496 | A | * | 8/1991 | Mishina et al. ................. 34/78 |
| 5,482,201 | A | * | 1/1996 | Leicht ........................ 228/49.5 |
| 5,615,825 | A | * | 4/1997 | Bobbio et al. ............... 228/206 |
| 6,732,911 | B2 | * | 5/2004 | Matsuki et al. ............. 228/219 |

* cited by examiner

FOREIGN PATENT DOCUMENTS

| DE | 199 11 887 C1 | | 12/2000 |
| EP | 1036626 | * | 9/2000 |
| EP | 1036626 A2 | * | 9/2000 |

*Primary Examiner*—Jessica L Ward
*Assistant Examiner*—Devang Patel
(74) *Attorney, Agent, or Firm*—Ohlandt, Greeley, Ruggiero & Perle, LLP; George W. Rauchfuss, Jr.; Charles N. J. Ruggiero

(57) ABSTRACT

The invention provides a process for soldering in the vapor phase in which after the solder has melted onto the item to be soldered a vacuum is generated around the item to be soldered in the vapor phase. Also provided is a device for soldering in the vapor phase comprising a first chamber containing the vapor phase and, inside the first chamber within the vapor phase, a second chamber in which a vacuum can be generated and into which the item to be soldered can be introduced. A third chamber communicates with the first chamber to allow the item to be soldered to be transferred into the first chamber by means of a transporting system. The process and device according to the invention are advantageous in that they ensure soldered joints having a higher quality than those of the prior art.

14 Claims, 1 Drawing Sheet

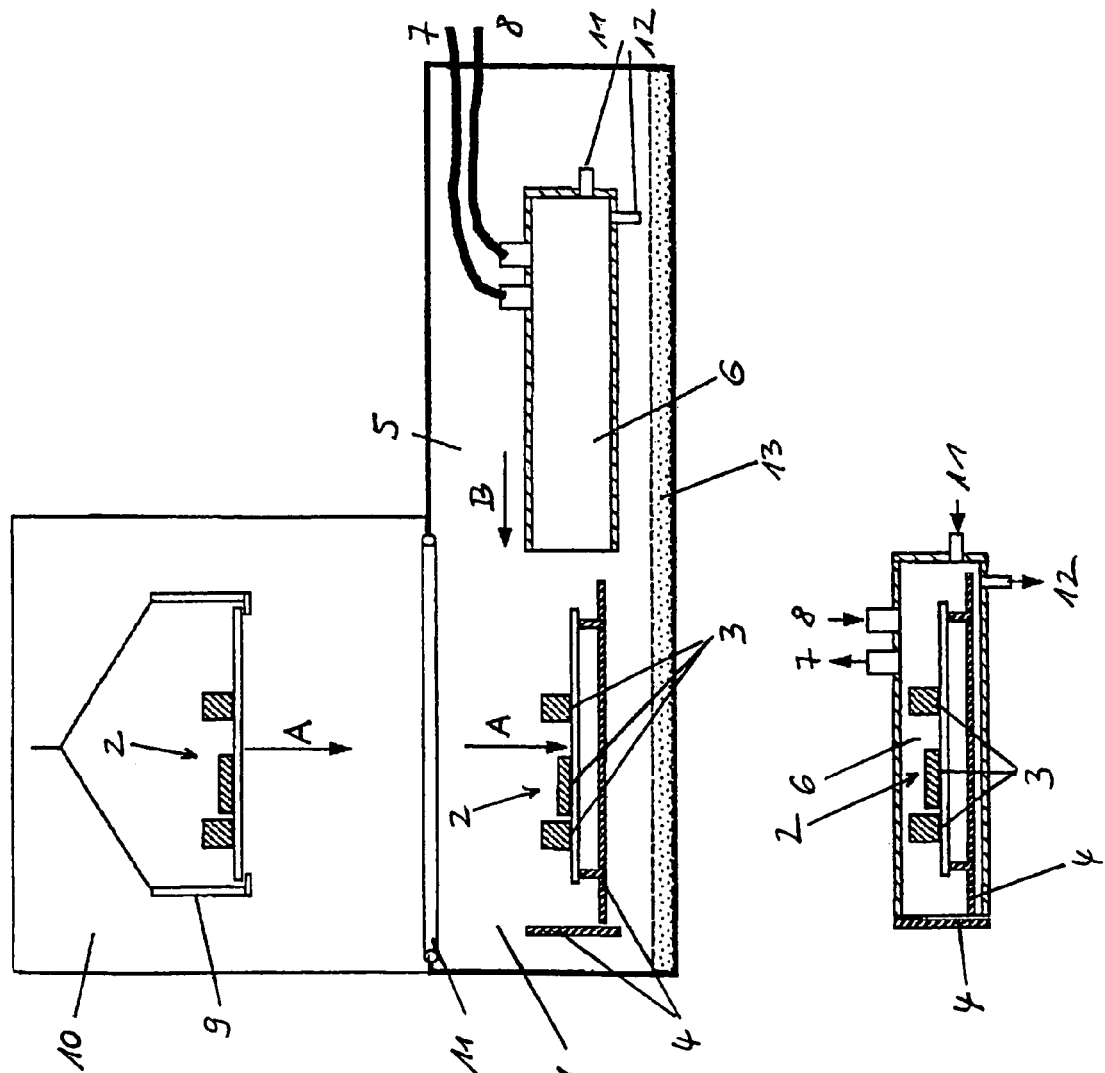

PROCESS AND DEVICE FOR SOLDERING IN THE VAPOR PHASE

The invention relates to a process and a device for soldering in the vapor phase.

In soldering processes and in particular reflow soldering processes using soft solders cavities can be formed in the solder. As a rule, these cavities are gas inclusions or inclusions of fluxing agents which were not able to escape from the melt of liquid solder during solidification of the solder. These defective spots might be disadvantageous for the soldered joint and impede the dissipation of heat from joints when utilizing the soldered components. In specific components it is therefore necessary to keep the number of cavities or voids in the joint small.

It is known that gas bubbles can be removed from liquids by generating a negative gauge pressure (i.e. a low pressure or vacuum). In metallography a low pressure is likewise used in order to remove bubbles from the viscous embedding medium. The same basic principle can be used in soldering in that a low pressure is generated in the area of the liquid soldered joint.

In normal reflow soldering processes, radiators or hot gases are typically used for heating the item to be soldered. However, these soldering processes are disadvantageous in that relatively large masses are heated slowly and in that they are almost unsuitable for soldering hidden parts. In the so-called vacuum soldering, these processes are used in connection with the generation of a low pressure in order to keep the number of cavities in the joint small.

The heat transfer in a condensing vapor phase (so-called vapor phase soldering) is more suitable for heating the item to be soldered. On the one hand, a better heat transfer is guaranteed and, on the other hand, the temperature of the vapor determines the maximum temperature to which the item to be soldered can be heated.

It is already known to use a pressure change in connection with the transfer of condensation heat. In accordance with the principles of thermodynamics, for example, the boiling point of a liquid can be changed by changing the ambient pressure of the liquid. This principle is used in U.S. Pat. No. 4,392,049 and DE-A-196 02 312. By changing the ambient pressure in a closed chamber, the boiling temperature of the liquid is changed therein and thus the temperature of the vapor is controlled. However, the direct use of a pressure change in the vapor phase leads to problems if the great advantage of a constant temperature during soldering should be used. Just this property is advantageous in that an automatic, physically caused protection against undesired high temperatures is given.

This problem is solved in that the heating process takes place in the vapor phase chamber and a subsequent vacuum process is carried out in a chamber located outside the vapor phase zone. DE-A-199 11 887 describes a corresponding device. For soldering, the heat is transferred by means of condensation, and afterwards the molten item to be soldered is transported from the vapor chamber into a neighboring chamber. In said neighboring chamber a vacuum is generated by means of a so-called vacuum bell jar in the area of the joints in order to allow the inclusions in the solder to escape and in order to produce joints containing almost no cavities. However, this procedure has essential disadvantages. If this vacuum step takes place after the soldering process, there is the problem that the item to be soldered must be kept viscous until the foreign matter forming the cavities had the chance to escape due to a vacuum to be generated. In DE-A-199 11 887 this problem is solved in that the item to be soldered is placed on a carrier which can be heated if required. The heat dissipation of the item to be soldered into the environment is thus compensated for and the joints are kept viscous. This might function with simple parts having a good surface contact with the hot carrier. However, as soon as the parts are more complex or the evacuation time is somewhat longer, the results of this arrangement are unsatisfactory. In order to compensate for this disadvantage of the process and avoid an undesired early solidification of the solder, the temperature of the item to be soldered must differ as much as possible from the melting point of the used solder when said item is transported out of the vapor phase. For this purpose, the item to be soldered is heated to about 10-15° C. above this melting temperature. Even higher temperatures are known in practice.

The problem that the solder solidifies too early, on the one hand leads to uncertainties in the manufacturing process since already slight changes in the ancillary conditions during evacuation or time delays caused by malfunction lead to a deterioration in the desired result. On the other hand, the restriction of the time period which the vacuum is allowed to act and which is caused by the execution limits or prevents the possible process variants such as, for example, changing pressure conditions, etc. However, the higher the temperature of the item to be soldered rises, the more disadvantageous is said temperature for the quality of the joints and materials. In addition to an increase in dealloying processes, it is also known that in lead-free solders relatively high temperatures lead to an increase in the voids in the solder. It is therefore desirable for various reasons to carry out the soldering process at a temperature lying only slightly above the melting temperature of the solder.

It is the object of the present invention to provide an improved process and an improved device in which defective spots (cavities) in the solder are reliably avoided. This object is achieved with the features of the claims.

In achieving this object, the invention starts out from the basic idea to generate a vacuum in the vacuum phase zone around the item to be soldered so that the solder degases. In a preferred embodiment of the invention, a vacuum (evacuation) chamber is provided into which the item to be soldered is transported. The vacuum chamber takes on the temperature of the vapor because it is located in the vapor phase. An additional heater can be used but is not necessary. The vacuum chamber is closed against the vapor phase, and the gas volume is sucked out of the vacuum chamber in order to generate a vacuum having a desired low pressure and remove gas inclusions from the solder.

The invention has the following advantages.

Since the vapor phase surrounds the vacuum chamber, the latter cannot cool down and therefore acts as a "complete radiator" which irradiates the item to be soldered with the maximum temperature of the vapor phase and thus very reliably avoids that the solder cools down too early. The boiling point of the medium forming the vapor phase must lie only slightly above the melting temperature of the solder because no temperature reserve must be present for avoiding a too early cooling down. For example, a temperature surplus of only 5° C. above the melting temperature of the solder is sufficient for a reliable soldering operation and a subsequent removal of voids.

In the following the invention will be described in more detail on the basis of the drawings in which FIG. 1 shows a simplified cross-sectional view of an embodiment of the invention, and FIG. 2 shows the item to be soldered according to FIG. 1 in the closed low pressure or vacuum chamber.

FIG. 1 shows a first chamber 5 comprising a vapor phase zone 1. The vapor phase is generated by the liquid medium 13 which is visible on the bottom of the chamber 5 and which preferably is an inert organic liquid. An item to be soldered 2 on a support or rest 4 is provided in the vapor phase zone 1. In the vapor phase zone there is moreover a second chamber 6 for generating a low pressure or vacuum around the item to be soldered 2. The item to be soldered 2 is transported by means of a transporting system 9 from a neighboring third chamber 10 in the direction of arrow A into the chamber 5. The connection between the first chamber 5 and the third chamber 10 is surrounded by a cooling tube 11 which retains the vapor phase in the first chamber and does not allow it to enter the chamber 10. The second chamber 6 for generating the vacuum is moved in the direction of arrow B across the support 4 comprising the item to be soldered 2 so that the vertical wall of the support 4 closes the second chamber 6. The chamber 6 is then evacuated for a predetermined time period through the connection 7 to a predetermined low pressure. The second chamber 6 is then again removed from the support 4 comprising the item to be soldered and the transporting system 9 takes the item to be soldered 2 and transports it from the first chamber 5 into the third chamber 10. From said third chamber 10 it is then transported away to be further processed (not shown).

If desired, it is possible to vary the height of the vapor phase 1 in order to reduce the heat transfer to the parts located in the vapor phase zone for a predetermined time. It is also possible to lower the vapor phase 1 for a short time when closing the vacuum chamber 6 and subsequently rise it again so that the chamber 6 contains as little vapor phase as possible for facilitating evacuation. Moreover, the chamber 6 comprising the item to be soldered 2 can already be closed before or while the solder is melting and the heat can then be transmitted to the item to be soldered by the irradiation heat of the chamber 6. In this case the heat transfer is caused by diffuse radiation of the chamber walls. After closing the chamber the evacuation of the chamber 6 can be delayed and also a very slowly increasing vacuum can be used since there is no risk that the solder of the joints solidifies too early because it is situated in the vapor phase.

If required, the vacuum chamber can also be lowered from the top onto the item to be soldered (not shown). In this case the heating through the chamber walls can be delayed if the upper part of the chamber is not always or only incompletely located in the vapor phase and radiant heat is transmitted to the item to be soldered mainly through the bottom part of the chamber.

FIG. 2 shows the support 4 comprising the item 2 to be soldered according to FIG. 1 after moving the second chamber 6 of FIG. 1 in the direction of arrow B across the support 4 and the item 2 to be soldered and closing it by the vertical wall of the support 4.

In order to remove, for example, fluxing agents from the joints already before melting, the chamber 6 comprising the item to be soldered can also be evacuated before melting the solder. Subsequently, the pressure is compensated and the soldering process is carried out.

In the vacuum chamber 6 the item to be soldered can be cleaned or treated further. The chamber 6 can comprise, for example, a device for generating a plasma. By means of a suitable plasma treatment of the item to be soldered, dirt on the substrate to be soldered is removed and the wettability is increased. A plasma treatment can take place before soldering, during the soldering process or afterwards. If desired, also an overpressure can be generated in the chamber 6. Furthermore, the item to be soldered can be treated by means of a process fluid which is introduced, for example, through the connection 11 into the chamber 6 and is then discharged through the connection 12 from the chamber 6. For example, the item to be soldered can be cooled after soldering or cleaned by means of the process fluid.

After evacuation through the conduit 7, the pressure can be compensated by means of an inert gas or another gas through the conduit 8. In the course of the pressure compensation the item to be soldered can be cooled in that the gas flows through the chamber 6 for a time that is longer than the time required for the pressure compensation.

The invention claimed is:

1. A process for soldering in the vapor phase, wherein before, during or after melting the solder (3) on the item to be soldered (2) a vacuum is generated around the item to be soldered (2) in the vapor phase, the process comprising the steps of:
   (a) transporting the item to be soldered into the vapor phase;
   (b) heating the item to be soldered in the vapor phase;
   (c) moving a vacuum chamber in the vapor phase laterally across the item to be soldered to enclose the item to be soldered and restrict the vapor phase;
   (d) generating a vacuum in the vacuum chamber for a predetermined time; and
   (e) compensating the pressure between an interior of the chamber and a space including the vapor phase.

2. The process according to claim 1, wherein the solder (3) is molten after step (a).

3. The process according to claim 1, wherein the solder (3) is molten after step (c).

4. The process according to claim 1, wherein the solder (3) is molten during step (d).

5. The process according to claim 1, wherein the height of the vapor phase is varied in a controlled manner.

6. The process according to claim 5, wherein the height of the vapor phase is lowered below the level of the item to be soldered for a short or long time period and then risen again while the chamber (6) encloses the item to be soldered (2).

7. The process according to claim 1, wherein the generation of the vacuum is delayed.

8. The process according to claim 1, wherein the pressure is compensated by means of an inert gas.

9. The process according to claim 8, wherein the inert gas cools the item to be soldered (2).

10. The process according to claim 1, wherein an overpressure is generated in the chamber (6) instead of step (d).

11. The process according to claim 1, wherein the item to be soldered (2) is additionally cleaned in a plasma in the chamber (6).

12. The process according to claim 1, wherein the item to be soldered (2) is heat treated or cleaned by means of a process fluid in the chamber (6).

13. A process for soldering an item (2) to be soldered in the vapor phase comprising the steps of:
   (a) arranging the item (2) to be soldered in a vacuum chamber (6) arranged in the vapor phase; and
   (b) generating a vacuum around the item (2) to be soldered within the vacuum chamber (6) before, during or after melting the solder, the process comprising the steps of:

(a) transporting the item to be soldered into the vapor phase;
(b) heating the item to be soldered in the vapor phase;
(c) lowering a vacuum chamber in the vapor phase from above onto the item to be soldered to enclose the item to be soldered and restrict the vapor phase;
(d) generating a vacuum in the vacuum chamber for a predetermined time; and
(e) compensating the pressure between an interior of the chamber and a space including the vapor phase.

14. The process according to claim 9, wherein the upper part of the chamber remains outside the vapor phase so that the item to be soldered is heated less from the top than from the bottom.

* * * * *